United States Patent Office 3,228,308
Patented Jan. 11, 1966

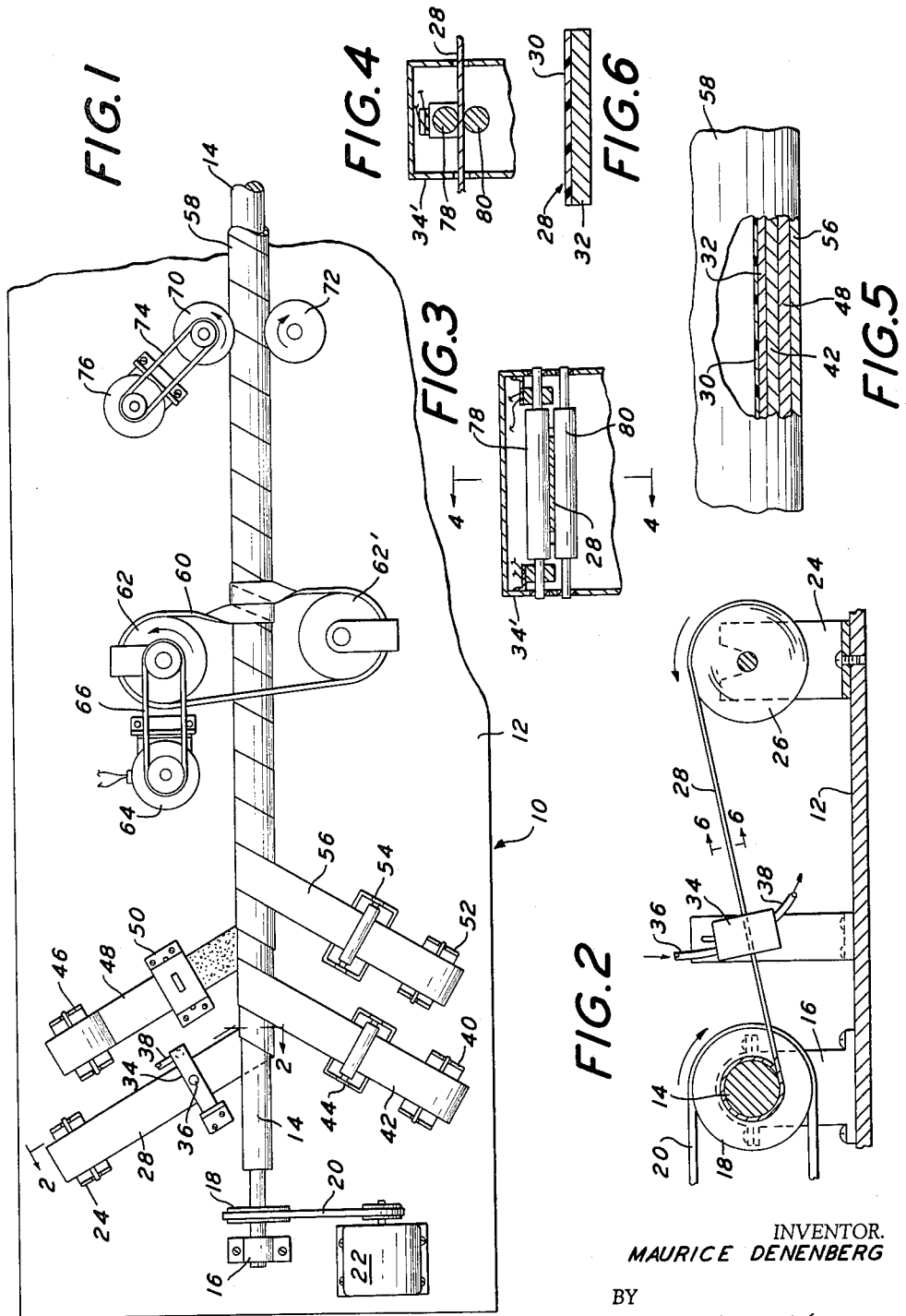

3,228,308
METHOD OF MAKING A LAMINATE ARTICLE
Maurice Denenberg, 20th and Washington Ave.,
Philadelphia 46, Pa.
Filed Apr. 15, 1963, Ser. No. 273,803
8 Claims. (Cl. 93—94)

This application is a continuation-in-part of my copending application Serial No. 177,008, entitled "Spiral Wound Tubing and Method of Making Same," filed March 2, 1962, now abandoned, and of my copending application Serial No. 171,009, entitled "Container Tubing," filed February 5, 1962, now abandoned.

This invention relates to the method of making a spiral wound tubing.

Heretofore, many devices and methods have been proposed for making spiral wound tubing. In general, these methods are directed to apparatus or methods for making spiral wound tubing or containers from paper strips. For example, see U.S. Patents 2,623,443 and 2,623,445. The tubing or containers produced by the apparatus or method in the above mentioned patents are not adapted to contain liquids. The spiral wound tubing or containers produced in accordance with the method of the present invention may contain liquids and are particularly adapted for use as oil cans, beer cans, etc.

In order to manufacture a spiral wound laminated tubing, which will be capable of having liquids disposed therein, it is necessary for the innermost layer to be an imperforate layer which is impervious and generally insoluble in the liquid to be contained and is usually waterproof. A suitable material for such an innermost layer is, for example, a metallic foil such as aluminum foil. However, the amount of friction between such a foil and the mandrel on which the tubing is wound is so great that the speed at which tubing is made is impractical on a commercial basis. In accordance with the present invention, the surface of the foil or other innermost layer which is adapted to be juxtaposed to the mandrel is coated with a wax release agent. The wax is preferably a carnauba wax dissolved in an organic solvent and applied directly to the metal foil.

The wax is applied directly to the surface of a laminated strip which is to be applied to the mandrel as the innermost layer in winding the tubing. The laminated strip used in forming the innermost layer is usually a slip-coated laminated strip, such as is available commercially. Before the laminated innermost layer is wound around the mandrel, heat is applied to the wax coating to raise the temperature to a temperature sufficient to decrease the coefficient of friction of the wax. The temperature may be, for example, a temperature approaching the melting point of the wax up to the vaporization temperature of the wax. Preferably, the temperature is sufficient to substantially decrease the coefficient of friction of the wax. When using such waxes as synthetic wax (e.g., polyolefin wax) or natural wax (e.g., vegetable wax such as carnauba wax, animal wax such as beeswax or Chinese insect wax, or mineral wax such as petroleum paraffin wax) melting in the 170–250° range, a temperature in the range of 120–300° F. may be entirely suitable; more specifically, where carnauba wax is used, I have found that the coefficient of friction of the wax is at a minimum when the temperature of the wax is between 150–200° F.

It is an object of the present invention to provide a novel laminated spiral wound tubing which is adapted to contain a liquid therein.

It is another object of the present invention to provide a novel method of making a spiral wound laminated tubing.

It is another object of the present invention to provide a novel method of reducing the friction between a rotating mandrel and a laminate spirally wound thereon.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is a top plan view of a typical apparatus for producing spiral wound tubing.

FIGURE 2 is a sectional view taken along the lines 2—2 of FIGURE 1.

FIGURE 3 is a longitudinal sectional view of a means for heating the innermost layer in accordance with another embodiment of the present invention.

FIGURE 4 is a sectional view taken along the lines 4—4 in FIGURE 3.

FIGURE 5 is a partial elevational view of tubing made in accordance with the present invention, with a portion thereof shown in section.

FIGURE 6 is a sectional view taken along the lines 6—6 in FIGURE 2.

Referring to the drawing in detail, wherein like numerals indicate like elements, there is shown in FIGURE 1 an apparatus for making spiral wound tubing designated generally as 10.

The apparatus 10 includes a horizontal support 12 on which the various elements of the apparatus 10 are supported. The apparatus 10 includes a horizontally disposed mandrel 14 having one end rotatably supported by a bearing support 16. A sheave 18 is secured to the mandrel 14 adjacent the bearing support 16. An endless drive belt 20 extends around the sheave 18 and the output shaft of a motor 22. Hence, motor 22 is operatively disposed so that it may rotate the mandrel 14 in the direction of the arrow in FIGURE 2.

An unwind stand 24 is supported on the support 12. A roll 26 of a laminate 28 is supported by the unwind stand 24. As shown more clearly in FIGURE 2, the laminate 28 is adapted to be wound around the mandrel 14 and thereby form the innermost layer of a spiral wound tubing. The laminate 28 comprises a layer of lining material, e.g., metal foil such as aluminum foil 32, and a layer of release agent wax 30, in this example carnauba wax which has been dissolved in an organic solvent. In FIGURE 2, the layer of wax 30 is on the uppermost surface of the laminate 28 so that it will be juxtaposed to the outer peripheral surface of the mandrel 14 when wound thereon.

A housing 34 is supported in any convenient manner between the mandrel 14 and the unwind stand 24. The housing 34 is provided with an inlet opening and outlet opening so that the laminate 28 may pass therethrough. As will be evident from FIGURE 1, the length of the housing 34 is substantially greater than the width of the laminate 28. A conduit 36 communicates with the housing 34 through a top wall thereof. The conduit 36 is an inlet conduit and is adapted to convey hot air into the housing 34. Means, not shown, are provided so that the temperature of the hot air is maintained between 150–200° F. Using the carnauba wax, the optimum temperature for the hot air is approximately 175° F. An outlet conduit 38 communicates with a bottom wall of the housing 34 and is adapted to convey the hot air away from the housing 34. As the laminate 28 passes through the housing 34, the temperature of the layer of wax 30 is raised so that it will be juxtaposed to the outer peripheral surface of the mandrel 14 at a temperature wherein it will have its minimum coefficient of friction.

In order to prevent undue loss in the temperature of the laminate 28, the housing 34 is preferably supported adjacent to the mandrel 14. After the laminate 28 has been applied around the mandrel 14 at an angle so that the laminate will be spirally wound thereon, a second layer will be wrapped therearound. The second layer is preferably a strip of relatively stiff paper 42. The strip of paper 42 is unwound from a roll supported on an unwind stand 40. An adhesive applicator 44 is supported between the unwind stand 40 and the mnadrel 14 so that adhesive will be applied to the surface of the strip of paper 42 which will be juxtaposed to the exposed surface of the layer of metal foil 32.

An unwind stand 46 is supported adjacent the unwind stand 24. The unwind stand 46 rotatably supports a roll of paper. A strip of paper 48 from the last mentioned roll is adapted to be applied against the outermost exposed surface of the strip of paper 42. An adhesive applicator 50 is supported between the mandrel 14 and the unwind stand 46. The applicator 50 applies a coating of adhesive, e.g., Borden NT-565 (a casein neoprene latex adhesive), to the exposed surface of the strip of paper 48, as seen in FIGURE 1, so that juxtaposed surfaces of the strips of paper 42 and 48 will be adhesively secured together. The strips of paper 42 and 48 may be identical.

An unwind stand 52 is supported adjacent the unwind stand 40. The unwind stand 52 supports a roll of paper such as a strip of paper 56. The strip of paper 56 is preferably a label which is spirally wound onto the exposed surface of the strip of paper 48. As described in the above mentioned patents, the printing on the label will be on a bias so that the printing will be properly disposed on the finished tubing or container. An adhesive applicator 54 is supported between the mandrel 14 and the unwind stand 40. The applicator 54 applies a coating of adhesive to the lowermost surface of the strip of paper 56 so that juxtaposed surfaces of the strips of paper 48 and 56 will be adhesively secured together.

A means is provided to mechanically grip the tubing 58 as it is disposed on the mandrel 14 and thereby apply pressure to assure a firm adhesive bond between the various layers of the tubing. Such means includes a tension belt 60 which is wrapped around the tubing 58 and around rotatably mounted sheaves 62 and 62'. Sheave 62' is an idler sheave. Sheave 62 is a drive sheave. Sheave 62 is driven by a drive belt 66 which is wound around the output shaft of a motor 64.

A means may be provided to mechanically move the tubing 58 along the mandrel 14 to the right in FIGURE 1. Such means may include a drive roller 70 and a back-up roller 72 on opposite sides of the tubing 58. An endless belt 74 will be disposed around a pulley on the roller 70 and the output shaft of a motor 76. If desired, the tubing 58 may pass from the rollers 70 and 72 through a cutting device which may cut the tubing 58 into lengths so as to be suitable for can or container bodies. Such a cutting device is illustrated in the above mentioned patents.

In FIGURE 3, there is disposed another embodiment of the heater device which may be utilized to raise the temperature of the layer of wax 30 on the laminate 28. As shown in FIGURE 3, a housing 34' is provided with a pair of horizontally disposed rollers 78 and 80. The laminate 28 is fed through the inlet and outlet openings in the housing 34' and between the rollers 78 and 80. The roller 78 is preferably an electrically heated roller so that it may raise the temperature of the juxtaposed layer of wax 30.

In view of the above remarks, it will be obvious to those skilled in the art as to the manner in which the above mentioned apparatus functions to produce spirally wound tubing. Since the innermost layer includes a layer of metal foil, the tubing will be capable of having a liquid or semi-liquid disposed therein. The layer of wax 30 is preferably a carnauba wax which is a hard wax. Carnauba wax is a waterproof wax. The application of heat thereto prior to contact with the outer peripheral surface of the mandrel 14 lowers the coefficient of friction of the wax thereby increasing the speed at which the tubing 58 will be produced.

The layer of wax 30 is preferably applied to the layer of foil 32 by a cold rotogravure process. For purposes of illustration only, the layer of wax 30 will have a thickness of approximately .0001 inch and layer of foil 32 will have a thickness of approximately .035 inch. The thicknesses of the layers 30 and 32 may be varied as desired.

Although aluminum foil was used as the lining material in the specific example illustrated above other lining materials, preferably imperforate, may be used including other metal foils as well as plastic or resin films such as polyolefin films, e.g., the polyethylene, polyproppylene and nylon films, and the like. Many such materials are useful as tubing linings and these materials and others may be selected by those in the art in accordance with the intended use. As a general guide, the lining material should be inert with respect to the intended contents for the container where it is desired to maintain the contents generally unchanged within the container.

Also, in the example above, the release agent wax was applied to the lining material from solution. Alternatively, the waxes may be applied in other ways, e.g., in molten form, or in resin carriers such as in nitrocellulose, ethylcellulose, vinylchloride, acrylic, vinylacetate, etc., resins and elastomer solutions. In such solutions, the wax component will be very small since the wax component comes to the surface after application of the solution to provide the wax coating or film for application against the rotating mandrel.

The present invention may be embodied in other specific forms without departing from the spirit or essential attributes thereof and, accordingly, reference should be made to the appended claims, rather than to the foregoing specification as indicating the scope of the invention.

I claim:

1. A method of making a spirally wound tube comprising the steps of spirally wrapping first, second and third layers on a rotating mandrel, applying an adhesive to a surface of said second and third layers before they are wrapped on said mandrel, said first layer being a laminate of wax on non-porous material and being the innermost layer, and heating said wax to a temperature between 150° F. and 200° F. prior to contact of the wax with the mandrel, said step of spirally wrapping said first layer including applying said wax to the outer peripheral surface of said mandrel while said wax is at said temperature.

2. A method in accordance with claim 1 wherein said step of heating said wax includes passing said first layer through a housing, and directing heated air at said layer of wax.

3. A method in accordance with claim 1 wherein said step of heating said wax includes passing said laminate adjacent a heated roller with the wax being in abutting contact with said roller.

4. A method in accordance with claim 1 wherein the wax is applied to the non-porous material by a rotogravure process.

5. A method of making a spirally wound tube comprising the steps of spirally wrapping a first layer comprising a coating of wax on a non-porous material selected from the class consisting of metal foil and plastic film on a rotating mandrel with the wax surface facing said mandrel while heating said wax to a temperature sufficient to decrease the coefficient of friction thereof prior to contacting the mandrel, applying adhesive between the first layer and a second layer, and spirally wrapping said second layer over said first layer with said adhesive disposed between said layers.

6. A method of making a spirally wound tube comprising the steps of spirally wrapping a first layer comprising a coating of wax on a non-porous material on a rotating mandrel with the wax surface facing said mandrel while heating said wax to a temperature in the range of 120° F. to 300° F. prior to contact of the wax with the mandrel, said wax having a melting point in the range of 170° F. to 250° F.

7. The method of claim 6 wherein said wax is selected from a class consisting of vegetable wax, animal wax and mineral wax.

8. A method of making a spirally wound tube comprising the steps of spirally wrapping first, second and third layers on a rotating mandrel, applying an adhesive to the inner surface of said second and third layers before they are wrapped on said mandrel, said first layer being a layer of non-porous material having a surface coated with wax disposed against said mandrel during spirally wrapping thereof and being the innermost layer, and heating said wax to a temperature in the range of 120° F. to 300° F. prior to contact with the mandrel, said step of spirally wrapping said first layer including applying the heated wax to the outer peripheral surface of said mandrel while said wax is at said temperature and is on said first layer.

References Cited by the Examiner
UNITED STATES PATENTS

| | | | |
|---|---|---|---|
| 2,402,038 | 6/1946 | Goldman et al. | 156—190 |
| 2,604,830 | 7/1952 | Heinle | 156—190 |
| 2,798,510 | 7/1957 | Martin et al. | 138—144 |
| 2,854,031 | 9/1958 | Donaldson | 138—144 |
| 2,988,970 | 6/1961 | Geist | 93—94 |
| 3,002,433 | 10/1961 | Dunlap | 93—94 |
| 3,051,061 | 8/1962 | Baxter et al. | 93—80 |
| 3,068,934 | 12/1962 | Mauck et al. | |

FRANK E. BAILEY, *Primary Examiner.*

LEWIS J. LENNY, BERNARD STICKNEY, *Examiners.*